Oct. 3, 1944.   W. K. ANDREW ET AL   2,359,601
WORK FIXTURE AND INDEXING MECHANISM THEREFOR
Filed Aug. 26, 1942   4 Sheets-Sheet 1
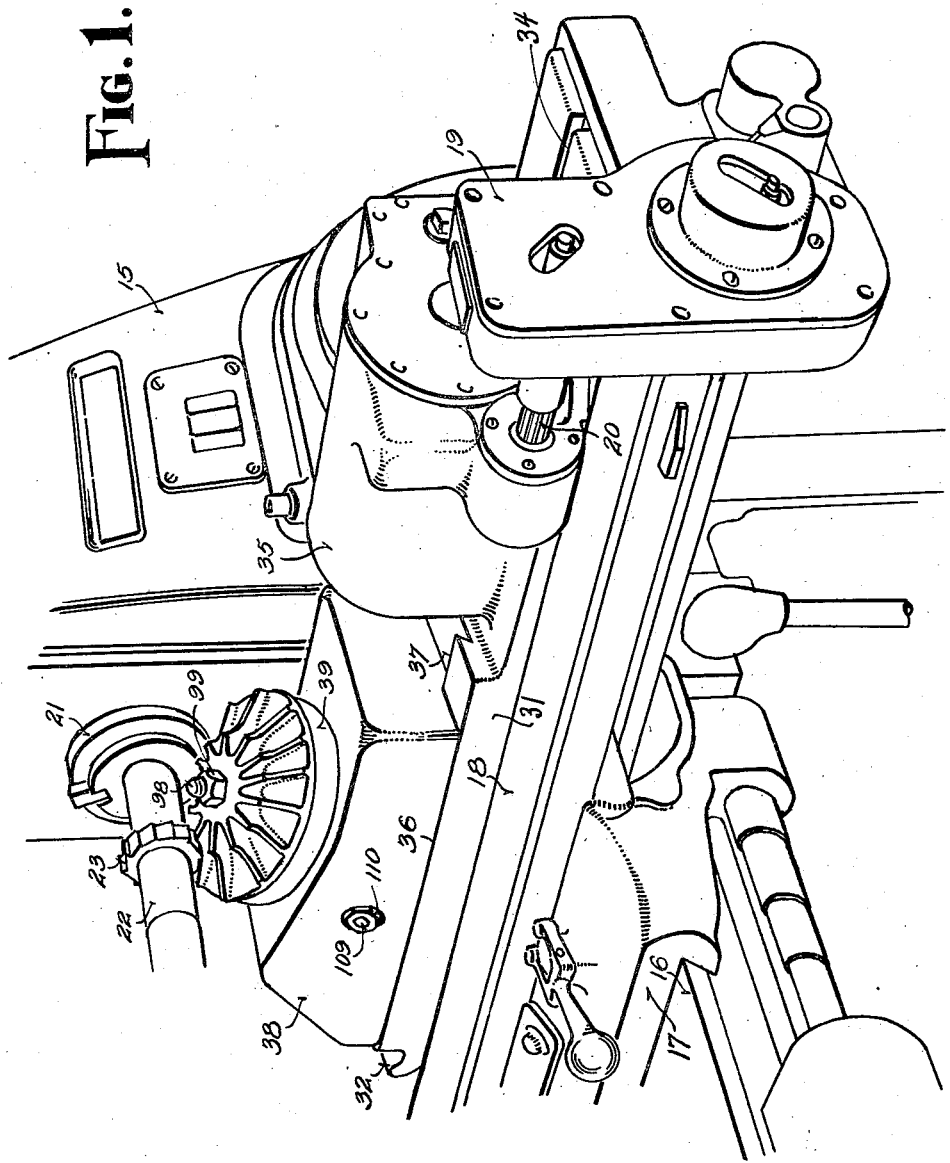
INVENTORS:
WILLIAM K. ANDREW,
MORRIS L. HUTCHENS
& JOHN B. LUKEY.
BY: W. D. O'Connor
ATTORNEY.

Oct. 3, 1944.     W. K. ANDREW ET AL     2,359,601
WORK FIXTURE AND INDEXING MECHANISM THEREFOR
Filed Aug. 26, 1942     4 Sheets-Sheet 2
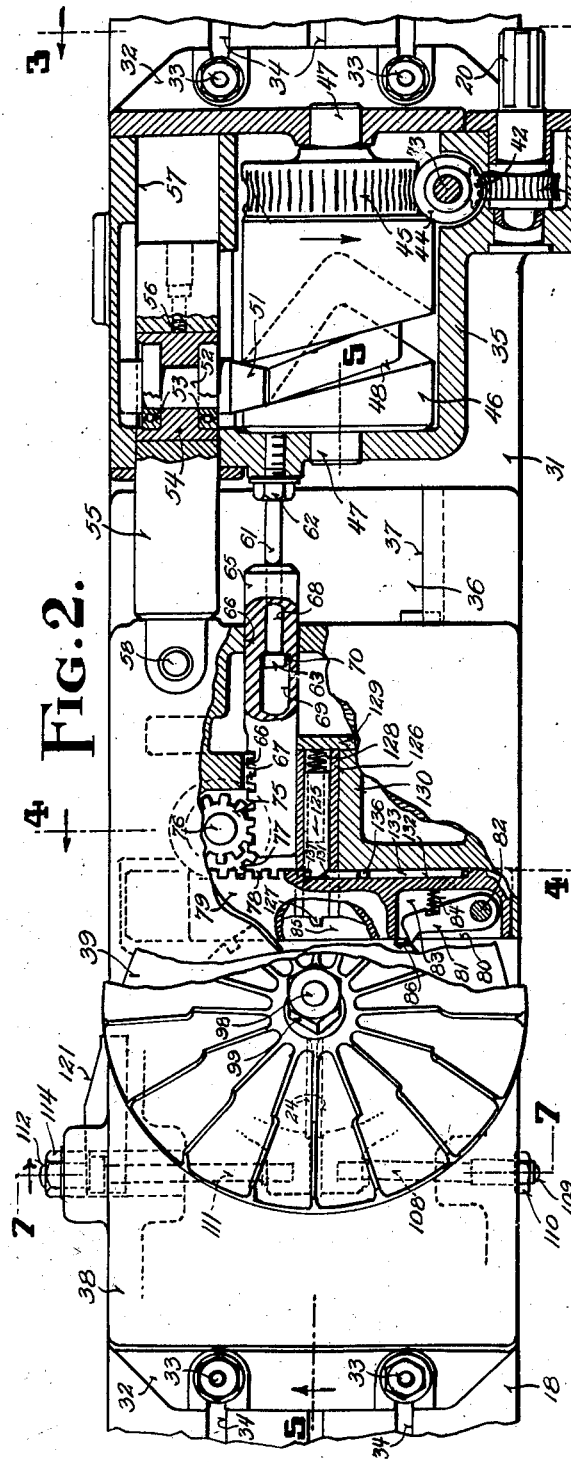
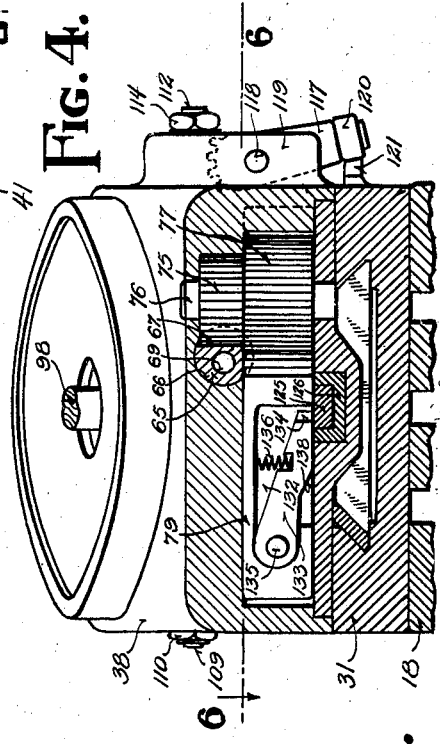
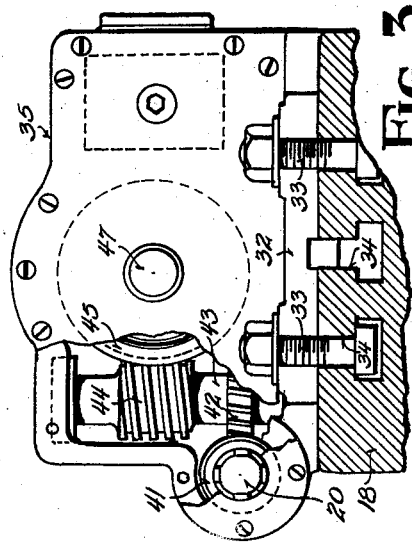
INVENTORS:
WILLIAM K. ANDREW,
MORRIS L. HUTCHENS
& JOHN B. LUKEY.
BY: W. D. O'Connor
ATTORNEY.

Oct. 3, 1944. W. K. ANDREW ET AL 2,359,601
WORK FIXTURE AND INDEXING MECHANISM THEREFOR
Filed Aug. 26, 1942 4 Sheets-Sheet 3
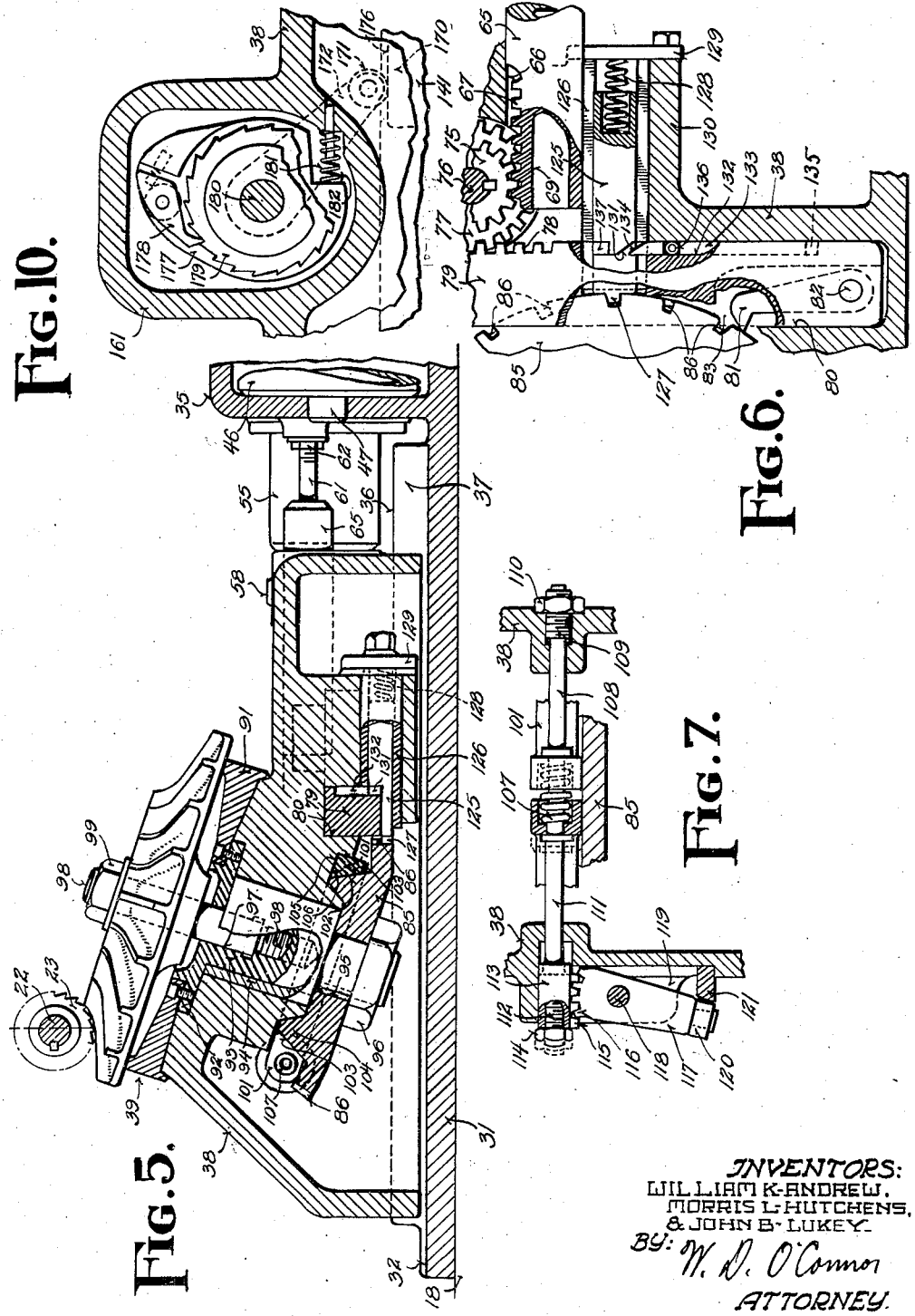
INVENTORS:
WILLIAM K. ANDREW,
MORRIS L. HUTCHENS,
& JOHN B. LUKEY.
BY: W. D. O'Connor
ATTORNEY.

Oct. 3, 1944.  W. K. ANDREW ET AL  2,359,601
WORK FIXTURE AND INDEXING MECHANISM THEREFOR
Filed Aug. 26, 1942  4 Sheets-Sheet 4
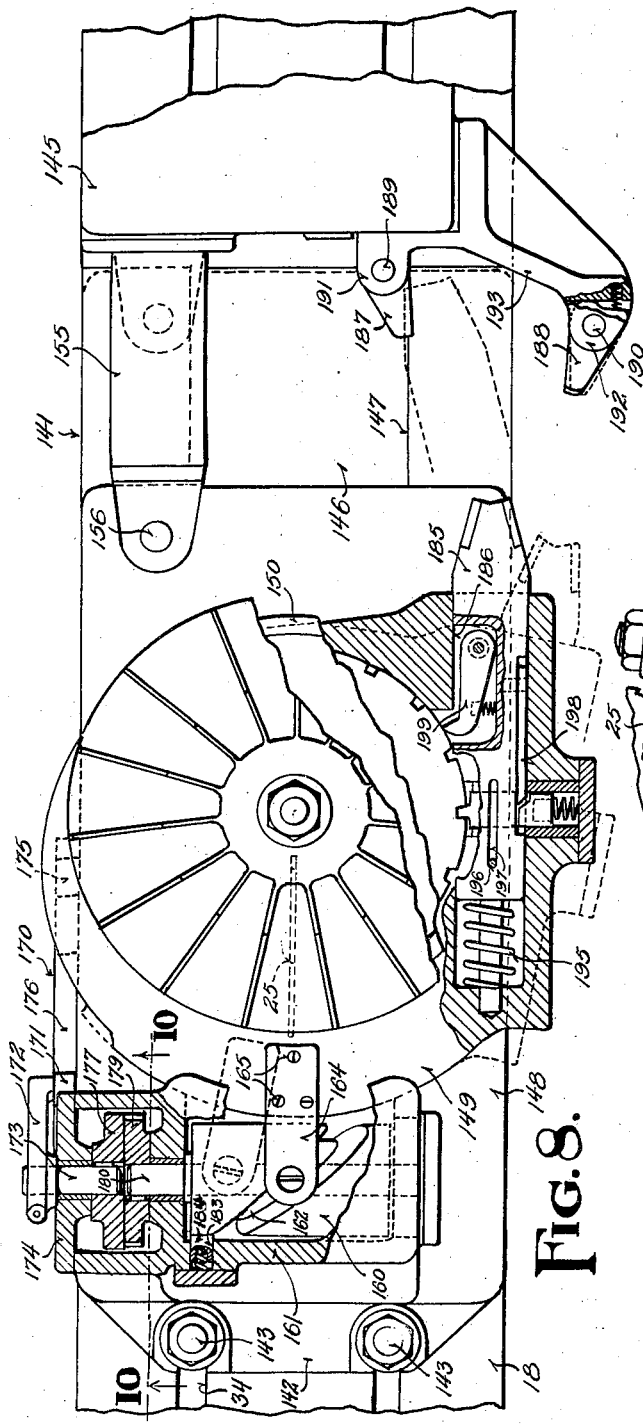
INVENTORS:
WILLIAM K. ANDREW,
MORRIS L. HUTCHENS
& JOHN B. LUKEY.
BY: W. D. O'Connor
ATTORNEY.

Patented Oct. 3, 1944

2,359,601

UNITED STATES PATENT OFFICE 2,359,601

WORK FIXTURE AND INDEXING MECHANISM THEREFOR

William K. Andrew and Morris L. Hutchens, Wauwatosa, and John B. Lukey, Milwaukee, Wis., assignors to Kearney & Trecker Corporation, West Allis, Wis., a corporation of Wisconsin Application August 26, 1942, Serial No. 456,444

20 Claims. (Cl. 90—18)

This invention relates, generally, to work holding fixtures and more particularly to a fixture especially adapted to effect indexing and feeding movements of a workpiece relative to a cutting tool.

A general object of the invention is to provide an improved work indexing and feeding mechanism for a machine tool.

Another object is to provide a new and improved work fixture of the type having transmission mechanism for imparting reciprocating movement to the body portion of the fixture and indexing mechanism operative in response to the reciprocating movement of the body portion to impart indexing movement to the work support.

Another object is to provide a new and improved indexing mechanism that is operative to impart major and minor indexing movements to the work support of a work fixture.

Another object is to provide a work holding fixture for a milling machine arranged to move a workpiece through a series of minor indexing movements and major indexing movements automatically.

Another object is to provide a new and improved indexing mechanism for the movable work support of a fixture that includes separate major and minor indexing mechanisms and means for correlating their operation in a manner to effect a series of minor indexing movements of the work support between major indexing movements of the work support.

Another object is to provide a work holding fixture for a milling machine arranged to effect a series of minor indexing movements and including mechanism operative at the end of a series of minor indexing movements to effect a major indexing movement.

Another object is to provide a work holding fixture by means of which a workpiece may be indexed about one axis to present successive areas for machining and indexed about another axis in machining each successive area.

According to this invention, an improved fixture is arranged for supporting a workpiece in manner to provide for both longitudinal feeding movements and indexing movements. Driving apparatus operates the fixture to effect reciprocation of a work holder for feeding the workpiece, and mechanism activated by the reciprocating movement effects the indexing during a non-cutting portion of the feeding stroke. Following the indexing movement, the work support is latched and clamped automatically prior to the cutting operation. According to a modification of the invention, the workpiece is supported for major indexing movements about one axis and for minor indexing movements about another eccentrically disposed axis, the arrangement being such that successive areas of the workpiece are presented for machining by the major indexing movement while each area is machined by successive cuts spaced by the minor indexing movement. This operation also is automatic, the minor indexing movements being effected as the result of the longitudinal feeding movements and the major indexing movement occurring at the end of a predetermined series of minor indexing movements.

The foregoing objects of the invention, and others which will become apparent as the following description proceeds, may be achieved by the particular work holding fixtures depicted in and described in connection with the accompanying drawings in which:

Figure 1 is a fragmentary view in perspective of the work and cutter supporting parts of a milling machine equipped with a work holding fixture embodying the present invention;

Fig. 2 is a top plan view of the work holding fixture shown in Fig. 1, parts having been broken away to better disclose the actuating mechanism;

Fig. 3 is a view partly in end elevation and partly in vertical section taken on the plane represented by the line 3—3 in Fig. 2, parts having been broken away to show the driving mechanism;

Fig. 4 is a view in vertical transverse section taken on the planes represented by the lines 4—4 in Fig. 2 and showing the working indexing and latching mechanism;

Fig. 5 is a fragmentary view in vertical longitudinal section through the fixture taken substantially on the plane represented by the line 5—5 in Fig. 2;

Fig. 6 is an enlarged fragmentary view of the indexing and latching mechanism in horizontal section, taken on the plane represented by the line 6—6 in Fig. 4, parts having been broken away;

Fig. 7 is a fragmentary view in vertical transverse section of the support clamping mechanism, taken on the plane represented by the line 7—7 in Fig. 2;

Fig. 8 is a top plan view generally similar to Fig. 2 but showing a modified form of the invention, parts having been broken away to show the minor and major indexing mechanism;

Fig. 9 is a view in front elevation of the fixture shown in Fig. 8, parts having been broken away to show the actuating mechanism; and Fig. 10 (sheet 3) is a fragmentary view in vertical section taken on the plane represented by the line 10—10 in Fig. 8 showing the ratchet mechanism that operates the minor indexing movement.

The work holding fixture to which this invention is directed may be utilized with any milling machine presenting a suitable supporting structure for the fixture and a cooperating milling cutter. The particular milling machine illustrated in Fig. 1 as an exemplary structure, is of the conventional knee and column type. As shown, the machine comprises essentially an upstanding supporting column 15 having a work supporting knee 16 slidably mounted for vertical adjustment upon its forward face. The knee 16 carries a saddle 17 mounted for horizontal in and out adjustment and the saddle, in turn, carries a transversely movable work supporting table 18 in the usual manner, the knee, saddle and table being movable to provide adjustment in three transverse planes.

For actuating the work supporting fixture embodying the present invention, the table 18 is provided at its right end with a power take-off bracket 19 from which a power take-off shaft 20 extends horizontally above the top of the table. The work holding fixture is mounted centrally on the table and the shaft 20 effects an operative driving connection between the bracket and the fixture.

Mounted in the column 15 above the table, is a cutter driving spindle 21 into which is fitted an arbor 22 carrying a suitable milling cutter 23 in cooperating relationship with the work supporting fixture. The cutter supporting spindle 21 and the power take-off shaft 20 are driven from suitable power sources through the usual transmission mechanism housed within the machine.

The machining operation for which the work holder embodying the invention is particularly adapted is that of forming the vanes on an impeller wheel. Machining of the impeller wheel requires several separate operations, each operation being performed with relationship to each vane by feeding and indexing an impeller blank relative to a suitably formed milling cutter on the arbor 22. The particular blank used as illustrative in this description is milled in three operations.

In the first operation, the milling cutter 23 shown in Fig. 1, mills the tops of the impeller vanes to the desired contour, the impeller blank being indexed and fed to the cutter alternately to effect successive machining of all the vanes. The second operation is that of straddle milling the vanes to reduce them to a predetermined thickness and it is performed by means of a straddle milling cutter 24 indicated in Fig. 2, the blank being fed and indexed in similar manner. The third operation is that of machining the area between successive vanes by means of a single thin cutter 25, as shown in Figs. 8 and 9. This operation is performed in a somewhat different manner, a series of successive cuts being taken between adjacent vanes by small indexing movements of the workpiece about an eccentrically positioned center, the workpiece then being indexed about its axis by means of a major indexing mechanism to present another area for machining.

In preparing to machine an impeller blank, the fixture is mounted on the milling machine table 18 in the proper position and the workpiece is secured upon the fixture. The knee 16, saddle 17 and table 18 are then moved by the usual manually operated adjusting means to bring the workpiece into cooperating relationship with the cutter 23. After the workpiece has been positioned in this manner, no further movement of the work table or its supporting saddle and knee is required since the fixture embodying the present invention provides for all the required lateral feeding movements and intervening indexing movements, the indexing and clamping operations being effected by mechanism operating as a result of the reciprocating feeding movement.

The work holding fixture shown in Figs. 1 to 7, by way of illustrating a practical structure incorporating the invention, comprises a base 31 presenting end flanges 32 provided with slots that receive anchoring bolts 33 cooperating with the usual T-slots 34 in the surface of the table 18 for securing the fixture to the table at any desired position. The base 31 of the fixture carries a transmission housing 35 into which the driving take-off shaft 20 extends. Adjacent to the housing 35, the base presents a flat portion 36 provided with ways 37 arranged to slidably receive and guide a longitudinally movable work carrying portion or supporting member 38 which is fitted to the ways by gibs and has rotatably mounted upon it an indexable work holder or table 39.

Power for effecting longitudinal reciprocating movement of the work carrying body structure 38 of the fixture along the ways 37 on the base is derived from the power shaft 20. As shown in Figs. 2 and 3, the shaft 20 has mounted upon it within the transmission housing 35 a helical gear wheel 41 that meshes with a complementary helical gear wheel 42 on a vertically disposed shaft 43. The shaft 43 also carries a worm 44 that meshes with and imparts movement to a worm wheel 45 secured to the outer end face of a cam drum 46 mounted on a horizontal shaft 47 also journalled in the transmission housing 35. The drum 46 is provided with a cam groove 48 which extends completely around the drum and is of such contour as to provide for imparting the desired movement to the movable body portion 38 of the fixture. A cam follower 51 for cooperating with the cam groove 48, is formed on the end of a stub shaft 52 rotatably mounted in bearings 53 carried by a bearing block 54 that is releasably retained in fixed position in a sliding bar 55 by means of a set screw 56. The bar 55 is guided for reciprocating movement in a channel 57 in the housing 35 and its forward end is secured to the movable portion 38 of the fixture by a pin 58 to form a driving connection therebetween.

The mechanism for imparting indexing movement to the work support 39 is actuated by the relative reciprocating movement between the body portion 38 of the fixture and the base 31 through the medium of a lost motion mechanism including a headed rod 61 and a fixed abutment 62 (see Fig. 2). The rod 61 is threadedly received in a boss formed on the wall of the transmission housing 35 and locked therein by means of a lock-nut that forms the fixed abutment 62. The indexing movement of the work support 39 is effected through contact of a portion of the indexing mechanism with the fixed abutment 62 and the retracting movement of the indexing mechanism is effected by contact with an enlarged head 63 formed on the inner end of the rod 61.

The work support indexing mechanism (see Figs. 2, 4 and 6) includes a sleeve or ram element 65 mounted for sliding movement in a bore 66 formed in the body portion 38 of the fixture. The sleeve 65 is provided with rack teeth 67 and has an axially extending bore 68 through which the rod 61 extends, the bore having an enlarged portion 69 adapted to receive the head 63 of the rod. A shoulder 70 formed by the junction of the bores 68 and 69, provides a working surface against which the head 63 of the actuating rod 61 operates to effect movement of the sleeve 65 during the return stroke of the work support indexing mechanism. The rack 67 formed on the sleeve 65 meshes with a pinion 75 mounted on a stub shaft 76 journalled vertically in the body portion 38 of the fixture. The shaft 76 also carries a second pinion 77, (Figs. 2, 4 and 6) preferably formed integrally with the pinion 75, that meshes with rack teeth 78 formed on an indexing bar or ram 79 guided for reciprocating movement in a channel 80 formed transversely through the body portion 38 of the fixture as shown in Fig. 2. An indexing pawl 81, rockably mounted on a pin 82, is housed within a recess 83 formed in the indexing or actuating bar 79, the pawl being normally maintained in contact with the peripheral surface of an indexing plate or template 85 by the action of a coil spring 84. The template 85 is operatively connected to the rotatable work support 39 and is provided on its periphery with a plurality of equally spaced recesses or notches 86 adapted to be successively engaged by the pawl 81 to effect indexing movement of the work support upon each successive cycle of machine operation.

The rotatable work support 39 (see Fig. 5) comprises a disc like member 91 secured to a flange portion 92 of a hub member 93 journalled for rotary movement in a bearing 94 mounted in the body portion 38 of the fixture, the bearing being inclined to the verttical in manner to support the disc 91 at an angle to provide for the required angular cutting operation upon the impeller vanes. The lower end of the hub 93 is provided with a key slot adapted to receive a key 95 by which the template 85 is secured to the hub 93. The lower extremity of the hub 93 is threaded to receive a nut 96 which serves to retain the template 85 securely on the hub 93 and also to prevent axial movement of the work support 39 in the body portion 38 of the fixture. The upper end of the hub portion 93 of the work support 39 is provided with a threaded axial bore 97 adapted to receive a stud 98 on which a workpiece may be positioned. The workpiece may be releasably retained in position on the disc 91 of the rotatable work support 39 by the application of a nut 99 to the upper end of the stud 98.

The clamping mechanism (see Figs. 5 and 7) provided for releasably retaining the rotatable work support in indexed position, includes a split ring 101 arranged to float between the template 85, secured to the work support 39, and a portion of the body 38. The split ring 101 is contractible to frictionally clamp the work support 39 on the body portion 38 and presents a bevel surface 102 adapted to cooperate with a complementary surface 103 formed on a ring 104 preferably formed integral with the template 85. A flat upper surface 105 on the ring 101 is adapted to cooperate with a bottom surface 106 formed on the body 38 surrounding the bearing 94.

The ends of the clamping ring 101 are recessed to house the ends of a coil spring 107 that normally tends to spread the ring 101 and urge the surface 102 out of clamping contact with the cooperating surface 103 on the template 85. One end of the split ring 101 is retained in predetermined position in the body portion 38 of the fixture, by a rod 108 that is axially adjustable. The inner end of the rod 108 is arranged to contact the head of a plug carried by the stationary end of the split ring 101 and the outer end of the rod 108 is arranged to be contacted by a set screw 109 threaded in the body portion 38 and adapted to be anchored in desired position of adjustment by a lock-nut 110. Movement of the other end of the ring 101 is effected by the operation of a push rod 111 mounted for sliding movement in the body portion 38 of the fixture. The inner end of the rod 111 is arranged to contact the head of a plug carried by the movable end of the ring 101 and the outer end of the rod is arranged to be contacted by a set screw 112 threadedly receivable in a sleeve element 113 guided for axial movement in the body portion 38. The set screw 112 may be retained in desired position of adjustment in the sleeve 113 by a lock-nut 114. The sleeve element 113 presents a series of rack teeth 115 adapted to mesh with a segmental gear 116 formed on a lever arm 117 pivotally mounted on a pin 118 secured in spaced ears 119 formed integral with the body portion 38. A cam follower 120 in the form of a roller rotatably mounted on the lower end of the lever 117 is adapted to contact the surface of a cam 121 secured to the base 31 of the fixture, as shown in Figs. 4 and 7.

The clamping and unclamping action of the split ring 101 is effected by the cam 121 and follower mechanism in response to relative movement between the body portion 38 and the fixed base 31 of the fixture. As the body portion 38 is moved away from the housing 35 under action of the transmission, the cam follower 120 encounters a rise on the cam 121 which results in imparting a rocking action to the lever 117 in a manner to urge the push rod 111 inwardly against the head of the plug in the movable end of the split ring 101. This results in contracting the ring in opposition to the pressure of the coil spring 107, and causes the respective surfaces 102 and 105 thereof to engage the cooperating surface 103 of the portion 104 on the template 85 and the surface 106 on the body portion 38 in a manner to frictionally retain the work support 39 against movement with respect to the body portion 38. The clamping action is completed prior to the engagement of the cutter 23 with the workpiece with the result that the workpiece is firmly anchored during the cutting operation.

Upon retraction of the body portion 38 to a position wherein the cutter no longer engages the workpiece, the clamping pressure is automatically released. The release of clamping pressure is effected by the action of the coil spring 107 which normally tends to spread the split clamping ring 101 and urge the cam follower 120 against the cam 121 in such manner that as the follower reaches the lower surfaces of the cam 121, the clamping pressure of the ring 101 on the work support 39 is relieved.

The latching mechanism (see Figs. 2, 4, 5 and 6) provided for releasably retaining the rotatable work support 39 in indexed position, is likewise under control of the indexing mechanism. It includes a latching plunger 125 guided in a bearing block 126 for longitudinal sliding movement in a plane normal to the path of movement of the indexing bar 79 with which the plunger 125 cooperates. The plunger 125 is provided at its forward end with a tooth 127 adapted to engage any one of the series of teeth or indexing notches 86 formed in the peripheral edge of the template 85 under the action of a coil spring 128 that reacts against the outer end of the plunger 125 and a cover plate 129 applied to a boss 130 on the body portion 38 of the fixture to normally retain the plunger in its forward or latching position. The plunger 125 is also provided with a cam surface 131 arranged to lie within a recess 132 formed in the index bar 79 when the plunger is in latching position.

A latch bar operating pawl 133 having a cam surface 134 is pivotally mounted on a pin 135 (Fig. 4) disposed within the recess 132 in the bar 79 in a manner to have the cam surface 134 on the pawl 133 engage the cam surface 131 on the plunger 125. By this cooperative action, the pawl effects withdrawal of the tooth 127 from locking engagement with one of the notches 86 in the template against the action of the spring 128, upon the initiating of movement of the index bar 79 and prior to the operation of the indexing pawl 81 to effect indexing movement of the work support 39. A coil spring 136 disposed within the recess 132 and contacting the latch operating pawl 133 insures the proper cooperation between the cam surfaces 134 and 131 in effecting the automatic release of the latching mechanism upon the initiation of the active or indexing stroke of the index bar 79.

In completing the indexing stroke of the bar 79, the pawl 133 passes beyond the plunger 125 and is freed from contact with it, the coil spring 128 then acting to urge the plunger 125 to its latching position whereupon the tooth 127 engages the next successive notch 86 to lock the work support 39 in indexed position. The coil spring 136 provides means for permitting the latch operating pawl 133 to rock a sufficient amount to permit it to pass over the cam surface 131 of the plunger 125 upon the return or idle stroke of the index bar 79. The rocking action is imparted to the pawl 133 on the return or idle stroke through the contact between cam surfaces 137 and 138 respectively formed on the plunger 125 and pawl 133 (Figs. 4 and 6).

A brief description of a cycle of operation will serve to clarify the action of the indexing, latching and clamping mechanisms in a manner to emphasize the simplicity of each and the positive manner in which they function to effect the accurate and automatic indexing of a workpiece to permit the completion of a series of spaced cutting operations without the necessity of manual adjustment of the workpiece. As previously mentioned, the workpiece chosen for illustrating the operation of the invention, is an impeller blank which requires accurate machining of the tops and sides of a plurality of equally spaced vanes, and also the machining of the surfaces of the blank between the several machined vanes.

The first operation, that of milling the top of each vane, is illustrated in Figs. 1 and 5 of the drawings. As shown in Fig. 5 of the drawings, the movable body portion 38 of the fixture is in its extreme forward position and the cutter 23 has just completed a machining operation on one of the vanes of the blank. Continued rotation of the cam drum 46 in the direction indicated by the arrow in Fig. 2 results in rapid movement of the body portion 38 of the fixture toward the transmission housing 35 to withdraw the workpiece from contact with the cutter 23. This movement is accomplished through the medium of the actuating bar 55 under the action of the cam follower 51 in the groove 48 of the drum 46. As the body portion 38 moves toward the housing 35, the clamping action of the ring 101 is relieved through the action of the spring 107 forcing the follower 120 down the sloping surface of the cam 121. After the body portion 38 has been retracted a sufficient distance to effect clearance between the cutter 23 and the workpiece, the outer end of the sleeve 65 is brought into contact with the lock-nut 62, thereby limiting movement of the sleeve 65. With the movement of the sleeve 65 thus interrupted, continued movement of the body portion 38 effects partial rotation of the pinion 75 by operation of the rack 67 formed on the now stationary sleeve 65. The rotary movement of the pinion 75 is imparted to the pinion 77 which in turn initiates the axial movement of the index bar 79. The initial movement of the index bar 79 effects the automatic release of locking engagement between the tooth 127 on the plunger 125 and an indexing notch 86 on the template 85 in a manner previously described. Continued movement of the body portion 38 effects continued movement of the index bar 79 which results in the engagement of the indexing pawl 81 with an indexing notch 86 to cause the work support 39 to be indexed to a new position.

Upon completion of the indexing movement of the work support 39, the latching plunger 125 is freed from contact with the latch operating powl 133 and is urged to its latching position under the action of the spring 128 wherein it acts to retain the work support 39 accurately in indexed position. As the drum 46 continues its rotation, the direction of movement of the work support 39 is reversed and it is then moved toward the cutter 23 during which movement the cam follower 120 rides up the sloping surface of the cam 121 to effect the clamping action of the split ring 101 on the work support 39 prior to engagement of the cutter 23 with the workpiece. In the course of this movement, the head 63 of the rod 61 engages the shoulder 70 formed in the sleeve 65 to arrest further movement of the sleeve 65 and effect the retracting action of the index bar 79 through the resulting rotary movement imparted to the pinions 75 and 77.

The second operation, that of straddle milling the vanes, may be effected by the use of a similar fixture having for the most part identical structural elements. In this instance, however, due to the variance between the angle of the top of the vane and the base surface, a work supporting element having a slightly lower degree of pitch is required to support the work receiving stud more nearly in vertical position. For this operation, the cutter 23 is replaced by a gang or double cutter 24 (Fig. 2) designed to insure uniform thickness of each vane, and the drum cam 46 is replaced by one providing a cam groove contoured to give the additional amount of movement required to complete the side milling of the spaced vanes.

The third operation, that of machining the surfaces between the several spaced vanes, may be effected by the use of a modified form of mixture, shown in Figs. 8 and 9 of the accompanying drawings, which is designed to effect minor indexing movements of the work support about an eccentrically positioned center for the purpose of machining each surface between adjacent vanes by several passes of the relatively thin cutter 25. A major indexing mechanism also is provided to index the work support about the axis of the impeller in such manner that the cutter may complete the entire machining operation between the several vanes on the workpiece in a series of successive operations without requiring any manual adjustment of the workpiece.

The modified form of fixture, shown in Figs. 8 and 9 of the drawings, is generally similar in construction to that previously described. It includes a base 141 provided with end flanges 142 having slots formed therein adapted to receive anchoring bolts 143 which are receivable in the usual T-slots 34 formed in the surface of the table 18 to secure the fixture in desired position on the table. The base has formed thereon a transmission housing 145 and presents a flat portion 146 that includes ways 147 adapted to guide a longitudinally movable body portion or work support 148 that carries a pivoted movable member or supporting element 149 on which an indexable work holder or support 150 is mounted. The movable member 149 is oscillatably mounted on the body portion or work supporting structure 148 for pivotal movement about an axis eccentric to that of the indexable work support and it provides a means through which minor indexing movements are imparted to the work support 150. The movable member 149 is mounted on the body portion 148 by the means of a bearing ring 151, seated in an annular recess 152 formed in the body portion and secured to a hub portion 153 of the member 149 by means of screws 154. The indexable work support 150 is similar in structure to the one previously described, but in the present instance it is supported eccentrically on the oscillatable member 149 in place of being mounted on a fixed center in the movable body portion, as in the other form of the fixture.

The transmission mechanism for imparting reciprocating movement to the body portion 148 of the fixture along the ways 147, may be identical with that previously described save for the fact that the contour of the cam groove is such that the movement of the body portion is sufficient to permit the cutter 25 to complete the somewhat longer stroke that the nature of the work requires. The transmission mechanism includes a sliding bar 155 secured to the movable body portion 148 of the fixture by means of a pin 156 through which connection the reciprocating movement is imparted to the movable body portion 148.

The relative movement between the body portion 148 and the base 141 of the fixture caused by the action of the transmission provides the means for effecting both the minor and the major indexing movements of the work support 150. In the minor indexing movement, the outer edge of the workpiece is indexed an amount less than the width of the cutter on each cycle of operation to insure a smooth finish for the sector shaped area that lies between adjacent vanes of the impeller. The center of pivoting movement for the minor indexing operation is eccentric from the axis of the workpiece a distance sufficient to bring it within the sector shaped area being machined. The position of the pivoting center is so chosen that the innermost part of the sector being machined moves relative to the cutter in an arc of small radius and curving in direction opposite to that of the outer edge of the workpiece. This results in forming a fillet or curved element of desired contour at the inner end of the sector.

The minor indexing movement of the work support 150 is accomplished by imparting periodic movement to the pivoted movable member 149 through the medium of a mechanism that includes a drum cam 160 journalled for rotation in a housing 161 formed on the movable body portion 148 of the fixture and disposed to lie adjacent to one side of the member 149. The drum cam 160 is provided with a cam groove 162 extending completely around the drum and adapted to receive a cam follower 163 mounted on the free end of an arm 164 secured to the member 149 by means of screws 165. Periodic rotary movement is imparted to the drum cam 160 by means of a ratchet mechanism that is actuated by a template cam 170 secured to the stationary base 141 of the fixture. As the movable body portion 148 of the fixture reciprocates in response to the operation of the transmission mechanism, a cam follower 171 in the form of a roller moves over the face of the cam 170 which presents low and high levels 175 and 176 respectively. The cam follower roller 171 is mounted on an arm 172 that is secured to a stub shaft 173 journalled in a cover plate 174 attached to the housing 161. A plate 177 secured to the inner end of the stub shaft 173 carries a spring urged pawl 178 (see Fig. 10) disposed to cooperate with a ratchet wheel 179 secured on the end of a shaft 180. The shaft 180 is formed integrally with the drum cam 160 in a manner to impart partial rotation to the drum cam each time the arm 172 is urged upwardly in traversing the contour of the template cam 170.

To insure the proper operation of the ratchet mechanism, the cam follower 171 is constantly retained in contact with the cam 170 by the action of a coil spring 181 disposed within the housing 161 and acting upon a surface 182 formed in the plate 177. The cam 170 is so arranged that the ratchet mechanism moves the drum cam 160 only when the work support is in the one extreme position wherein the cutter is free from contact with the workpiece.

On each cycle of operation, the partial rotation of the drum cam 160 effects an advancing movement of the arm 164 through the action of the cam groove 162 on the cam follower 163 which causes a minor indexing movement of the work support 150 resulting in presenting a new surface of the workpiece on which the cutter can act during the next cutting stroke in the cycle of operation. The drum 160 is frictionally retained against accidental rotation by means of a brake mechanism which places a frictional drag on the drum to resist any movement thereof other than that imparted by action of the ratchet mechanism. The brake mechanism is fitted in a bore 183 formed in the housing 161 (Fig. 8) and includes a spring urged plunger 184 guided in the bore and positioned to frictionally engage the peripheral surface of the drum.

Upon the completion of a machining operation on one surface, a major indexing operation of the work support 150 is effected to index the workpiece to a position wherein the cutter 25 will operate on the surface between the next two succeeding vanes.

j. The major indexing operation of the work support 150 on the movable member 149 is accomplished by a mechanism mounted on the member 149. This indexing mechanism is generally similar in construction and mode of operation to that previously described in connection with the fixture illustrated in Figs. 1 to 7 of the drawings and includes an index bar 185 guided for reciprocating movement in a channel 186 formed in a boss on the member 149. The only material structural difference between the indexing mechanisms lies in the fact that the bar 185, in the modified form of fixture, is mounted on the oscillatable member 149 and is provided with an end portion that extends toward the transmission housing 145 in a manner to be actuated directly by contact with either of a pair of abutment elements 187 and 188 mounted on the housing. As shown, the abutments are pivotally mounted on pins 189 and 190 respectively secured in laterally spaced ears 191 and 192 formed on a bracket 193 attached to the transmission housing 145 on the base 141 of the fixture. The index bar 185 is normally urged to its outer extreme position through the action of a coil spring 195 disposed within the channel 186 and reacting against the inner end of the channel 186 and the end of the index bar 185. The extent of movement of the bar 185 is limited by a set screw or pin 196 having its lower or inner end disposed within a slot 197 formed in the bar 185 and arranged to contact the ends of the slot to arrest movement of the bar. The index bar 185 is provided with latch operating and indexing pawls 198 and 199 respectively that function in manner similar to that previously described in connection with the pawls 81 and 133 of the other fixture.

b. A brief description of a cycle of operation of the modified form of fixture shown in Figs. 8, 9 and 10 will serve to clarify the action of the minor and major indexing mechanisms. As previously mentioned, these mechanisms effect the accurate and automatic indexing of a workpiece to permit the machining of the sector shaped areas disposed between adjacent vanes of the impeller and operate to continue the process between each successive pair of vanes in an automatic cycle without requiring any manual adjustment of the workpiece. As shown in Figs. 8 and 9 of the drawings, the movable body portion 148 is in its extreme forward position and the cutter 25 has completed the machining operation for a particular cutting stroke. Further operation of the transmission mechanism results in rapid movement of the body portion 148 of the fixture toward the transmission housing 145 to withdraw the workpiece from contact with the cutter 25. As the body portion 148 of the fixture moves toward the housing 145, the cam follower 171 moves through an idle stroke as it passes from the high surface 176 to the low surface 175 of the cam 170. Continued operation of the transmission mechanism effects a reversal of direction in the path of travel of the body portion 148 with the result that the cam follower 171 moves through an active stroke from the low to the high level of the cam 170 and imparts a rocking action to the arm 172 to cause the pawl 178 to effect partial rotation of the drum cam 160 through contact with the ratchet wheel 179.

The cam 160 is always moved counterclockwise under the action of the ratchet mechanism and the oscillatable member 149 will be moved step by step in clockwise direction during one half revolution of the cam 160 and in like manner in counterclockwise direction during the remaining half revolution. The step by step movement of the oscillatable member 149 is conveyed directly to the work support 150 which is normally retained in latched position on the member 149, with the result that a minor indexing movement is imparted to the workpiece prior to each successive cutting stroke of the cutter. The minor indexing movements continue automatically in one direction until such time as the cam follower 163 reaches an extreme position in the cam groove 162 which occurs simultaneously with the last pass of the cutter required to complete the machining operation between a particular pair of adjacent vanes. As the body portion 148 is drawn toward the housing 145 after the completion of the last cutting stroke in a particular series of minor indexing movements, a major indexing movement is effected to cause the workpiece to index to a position wherein the cutter will begin operation between the next successive pair of vanes.

The major indexing movement is effected by contact of the outer end of the index bar 185 with the one or the other of the abutments 187 and 188. With the member 149 moving in a counterclockwise direction, as shown in Fig. 8, the end of the index bar 185 contacts the abutment 187 to arrest further movement of the bar 185 upon continued movement of the body portion 148 of the fixture under the influence of the transmission mechanism. As the body portion 148 continues to move, the arrested movement of bar 185 causes relative movement between the bar 185 and the oscillatable member 149 which is carried on the body portion 148. With the member 149 continuing to move relative to the now stationary bar 185, the latching pawl 198 acts to release the locking engagement between the locking plunger and a notch in the indexing plate carried by the work support 150. The indexing pawl 199 then engages the next successive notch in the indexing plate to cause a major indexing movement of the work support 150.

Upon completion of the major indexing movement between the work support 150 and the oscillatable member 149, the latching plunger automatically reengages a notch in the indexing plate to releasably retain the work support 150 and member 149 in fixed relationship. As the transmission continues to drive the body portion 148 toward the cutter, the coil spring 195 urges the index bar 185 outwardly on its idle stroke to reposition it for the next successive major indexing operation. This is accomplished by contact between the index bar 185 and the abutment 188 upon the completion of the next series of minor indexing movements which will cause the member 149 to move in a clockwise direction. At the termination of this series, the outer end of the bar 185 will contact the fixed abutment 188 in retracting the workpiece from contact with the cutter upon completion of the last cutting stroke in the series. This results in effecting another major indexing movement of the work support 150 in the manner previously described.

From the foregoing detailed description of the structure and operation of the illustrative embodiments of the present invention, it will be apparent that a new and improved work fixture and indexing mechanism therefor has been provided that is especially adapted for convenient application to the table of a milling machine and that operates in a manner to expedite the accomplishment of a machining operation in an automatic cycle, with a degree of accuracy and a saving of time that renders it particularly adaptable for production purposes.

Although the illustrative embodiments of the invention have been described in considerable detail for the purpose of making a full disclosure of a practical and operative structure by which the invention may be practiced, it is to be understood that various novel features of the invention may be incorporated in other structural forms without departing from the spirit and scope of the invention as defined in the subjoined claims.

The principles of the invention having now been fully explained in connection with the foregoing description of the embodying apparatus, we hereby claim as our invention:

1. In a work holding fixture for a machine tool, a work holder, a supporting element arranged to carry said work holder for indexing movement about a predetermined axis, a work support arranged to carry said supporting element for indexing movement about another axis eccentric to the indexing axis of said work holder, means to reciprocate said work support in a feeding movement, means responsive to reciprocating movement of said work support to effect indexing of said supporting element, and indexing mechanism responsive to said reciprocating movement and operative upon termination of a series of indexing movements of said supporting element to effect an indexing movement of said work holder.

2. In a work holding fixture for a machine tool, a base, a work supporting structure slidably mounted on said base, a supporting element pivotally mounted on said structure, a work holder pivotally mounted on said supporting element for indexing movement about an axis eccentric to the axis of pivotal movement of said supporting element, indexing means operative in response to sliding movement of said work supporting structure to effect indexing movement of said pivotally mounted supporting element, and other indexing mechanism operative at the termination of a series of indexing movements of said supporting element to index said work holder.

3. The combination with a machine tool including a rotatable cutter and a stationary fixture support, of a fixture including a base for attachment to said fixture support, a movable body portion mounted on said base, a movable member mounted on said body portion, an indexable work support carried by said movable member, a transmission mechanism operative to impart movement to said body portion, a minor indexing mechanism operative on said movable member in response to relative movement between said body portion and said base to impart a minor indexing movement to said work support, and a major indexing mechanism operative on said work support in response to relative movement between said body portion and said base to impart a major indexing movement to said work support on said movable member.

4. The combination with a machine tool including a rotatable cutter and a stationary fixture support, of a fixture including a base for attachment to said fixture support, a movable body portion mounted on said base, a movable member mounted on said body portion, an indexable work support carried by said movable member, a transmission mechanism operative to impart movement to said body portion, a minor indexing mechanism operative on said movable member in response to relative movement between said body portion and said base to impart a minor indexing movement to said work support, and a major indexing mechanism carried by said movable member and operative on said work support at either extreme position of movement of said member to impart a major indexing movement to said work support with respect to said movable member.

5. The combination with a machine tool including a rotatable cutter and a stationary fixture support, of a fixture including a base for attachment to said fixture support, a movable body portion mounted on said base, a movable member mounted on said body portion, an indexable work support carried by said movable member, a latching mechanism operative to normally retain said movable member and said indexable work support in fixed relationship, a transmission mechanism operative to impart movement to said body portion, a minor indexing mechanism operative on said movable member in response to relative movement between said body portion and said base to impart a minor indexing movement to said work support, and a major indexing mechanism operative on said work support in response to relative movement between said body portion and said base to release said latching mechanism and impart a major indexing movement to said work support on said movable member.

6. The combination with a machine tool including a rotatable cutter and a stationary fixture support, of a fixture including a base for attachment to said fixture support, a movable body portion mounted on said base, a movable member mounted on said body portion, an indexable work support carried by said movable member, a transmission mechanism operative to impart movement to said body portion, an indexing mechanism operative in response to relative movement between said body portion and said base to impart indexing movement to said movable member and said work support, and a second indexing mechanism operative to periodically impart an indexing movement to said work support on said movable member.

7. The combination with a machine tool including a rotatable cutter and a stationary fixture support, of a fixture including a base for attachment to said fixture support, a movable body portion mounted on said base, a movable member mounted on said body portion, an indexable work support carried by said movable member, a latching mechanism operative to normally retain said movable member and said work support in fixed relationship, a transmission mechanism operative to impart movement to said body portion, an indexing mechanism operative in response to relative movement between said body portion and said base to release said latching mechanism and impart indexing movement to said movable member and said work support, and a second indexing mechanism operative to periodically impart an indexing movement to said work support on said movable member.

8. In a work holding fixture, the combination with a base, of a movable body portion on said base, a movable member on said body portion, an indexable work support on said movable member, a transmission mechanism operative to move said body portion, a minor indexing mechanism responsive to relative movement between said body portion and said base for imparting movement to said movable member and work support, and a major indexing mechanism responsive to movement of said member for periodically effecting indexing movement of said work support with respect to said movable member.

9. In a work holding fixture, the combination with a base, of a movable body portion on said base, a movable member on said body portion, an indexable work support on said movable member, a latching mechanism operative to normally retain said movable member and indexable work support in fixed relationship, a transmission mechanism operative to move said body portion, a minor indexing mechanism responsive to relative movement between said body portion and said base for imparting movement to said movable member and work support, and a major indexing mechanism responsive to movement of said member for periodically effecting the release of said latching mechanism and imparting a major indexing movement of said work support with respect to said movable member.

10. A work holding fixture comprising a base for attachment to a fixture supporting member of a machine tool, a body portion guided for reciprocating movement on said base, a transmission operative to effect reciprocating movement of said body portion, a movable member mounted on said body portion, an indexable work support mounted on said movable member, a minor indexing mechanism operative upon movement of said body portion to effect unitary minor indexing movement of said movable member and work support, and a major indexing mechanism operative at predetermined positions of said movable member to effect major indexing of said work support relative to said movable member.

11. A work holding fixture comprising a base for attachment to a fixture supporting member of a machine tool, a body portion guided for reciprocating movement on said base, a transmission operative to effect reciprocating movement of said body portion, a movable member mounted on said body portion, an indexable work support mounted on said movable member, a minor indexing mechanism operative upon movement of said body portion to effect unitary minor indexing movement of said movable member and work support, and a major indexing mechanism rendered operative by movement of said movable member to either of two extreme positions of movement to effect independent indexing movement of said work support relative to said movable member.

12. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, an indexing mechanism responsive to relative movement between said base and said body portion and operative to effect lateral movement of said member and a minor indexing movement to said work support, and a second indexing mechanism responsive to lateral movement of said member and operative to effect a major indexing movement to said work support with respect to said movable member.

13. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, an indexing mechanism on said body portion and operatively associated with said member, cam means operative to actuate said indexing mechanism whereby said member and work support are indexed simultaneously, and a second indexing mechanism carried by said movable member, said second indexing mechanism being associated with said work support and operative in response to lateral movement of said member and reciprocating movement of said body portion to index said work support with respect to said movable member.

14. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, an indexing mechanism carried by said body portion and including a ratchet mechanism operative to impart simultaneous movement to said movable member and work support on each cycle of reciprocation of said body portion, a latching element operative to normally retain said movable member and work support in fixed relationship, and a second indexing mechanism carried by said movable member and operative in response to lateral displacement of said movable member and reciprocating movement of said body portion to release said latching element and effect indexing of said work support with respect to said movable member 15. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, an indexing mechanism carried by said body portion and including a ratchet mechanism operative to impart simultaneous movement to said movable member and work support on each cycle of reciprocation of said body portion, a latching element operative to normally retain said movable member and work support in fixed relationship, an abutment on said base, and a second indexing mechanism carried by said movable member including an element adapted for contact with said abutment and operative in response to lateral displacement of said movable member and reciprocating movement of said body portion to release said latching element and effect indexing of said work support with respect to said movable member.

16. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, a cam element on said base, a cam follower on said body portion, an indexing mechanism responsive to the action of said cam element and follower and operative to effect lateral movement of said member and a minor indexing movement to said work support, and a second indexing mechanism responsive to lateral movement of said member and operative to effect a major indexing movement to said work support with respect to said movable member.

17. In a work holding fixture, the combination with a base, of a body portion movably mounted on said base, a transmission mechanism for effecting reciprocating movement of said body portion on said base, a movable member oscillatably mounted on said body portion, an indexable work support carried by said movable member, a cam element on said base, a cam follower on said body portion, an indexing mechanism carried by said body portion and including a ratchet mechanism operative to impart simultaneous movement to said movable member and work support on each cycle of reciprocation of said body portion, a latching element operative to normally retain said movable member and work support in fixed relationship, an abutment on said base, and a second indexing mechanism carried by said movable member and including an element adapted to contact with said abutment and operative in response to lateral displacement of said movable member and reciprocating movement of said body portion to release said latching element and effect indexing of said work support with respect to said movable member.

18. In a work holding fixture for a machine tool, a base, a supporting member movably mounted on said base for step-by-step indexing about a predetermined pivot point, a work holder pivotally mounted on said supporting member for indexing movement about a pivot point spaced from the pivot point of said supporting member, and transmission mechanism arranged to effect coordinated indexing movements of said supporting member and said work holder, the arrangement being such that successive elements of a work piece on said work holder may be moved in an arcuate path to provide for machining a series of arcuate contours thereon.

19. In an indexing mechanism for a machine tool, a supporting structure, an indexable member rotatably mounted on said supporting structure, an indexing plate associated with said member, a latching plunger resiliently urged to lock said indexing plate in predetermined position, an actuating bar arranged to be moved tangentially of said indexing plate, a pawl pivotally mounted on said bar and arranged to have wedging engagement with said latching plunger when said bar is moved in one direction to release it from said indexing plate, and an indexing pawl pivotally mounted on said bar and arranged to engage said indexing plate after said latching plunger has been released to effect an indexing movement of said indexable member, said pawls being arranged respectively to ride over said latching plunger and said indexing plate on the return movement of said actuating bar.

20. In an indexing apparatus for a machine tool, a base, a supporting member slidably mounted on said base, an indexable element carried by said supporting member, means to effect reciprocating movement of said supporting member on said base, a ram slidably mounted for longitudinal movement in said supporting member, a lost motion mechanism connected to effect movement of said ram in response to sliding movement of said supporting member, a second ram slidably mounted for movement transversely of said supporting member, means interconnecting said rams to cause movement of said second ram in response to movement of said first ram, a latching plunger disposed to retain said indexable element in indexed position, a pawl carried by said second ram and arranged to disengage said latching plunger upon an indexing movement of said ram, and an indexing pawl carried by said second ram and operative to effect indexing movement of said indexable element subsequent to disengagement of said latch.

WILLIAM K. ANDREW.
MORRIS L. HUTCHENS.
JOHN B. LUKEY.